United States Patent
Liu

(10) Patent No.: US 12,462,338 B2
(45) Date of Patent: Nov. 4, 2025

(54) SUPER-RESOLUTION IMAGE RECONSTRUCTION METHOD AND DEVICE

(71) Applicant: TCL China Star Optoelectronics Technology Co., Ltd., Guangdong (CN)

(72) Inventor: Jinfeng Liu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 58 days.

(21) Appl. No.: 17/429,950

(22) PCT Filed: Jul. 21, 2021

(86) PCT No.: PCT/CN2021/107498
§ 371 (c)(1),
(2) Date: Dec. 29, 2022

(87) PCT Pub. No.: WO2022/267136
PCT Pub. Date: Dec. 29, 2022

(65) Prior Publication Data
US 2024/0046414 A1 Feb. 8, 2024

(30) Foreign Application Priority Data
Jun. 24, 2021 (CN) .......................... 202110702940.5

(51) Int. Cl.
G06T 3/4053 (2024.01)
G06T 3/4023 (2024.01)

(52) U.S. Cl.
CPC .......... *G06T 3/4053* (2013.01); *G06T 3/4023* (2013.01)

(58) Field of Classification Search
CPC .......................... G06T 3/4053; G06T 3/4023
See application file for complete search history.

(56) References Cited

U.S. PATENT DOCUMENTS 5,329,614 A * 7/1994 Kidd ..................... G06T 3/4023
345/671
6,002,810 A * 12/1999 Wakisawa ................ G09G 5/00
348/E7.003

(Continued)

FOREIGN PATENT DOCUMENTS

CN 1543221 11/2004
CN 1543221 A * 11/2004

(Continued)

OTHER PUBLICATIONS

Notification of Office Action and Search Report Dated Aug. 25, 2023 From the State Intellectual Property Office of the People's Republic of China Re. Application No. 202110702940.5 and Its Translation Into English. (21 Pages).

(Continued)

*Primary Examiner* — Henok Shiferaw
*Assistant Examiner* — Woo C Rhim

(57) ABSTRACT

The present application provides a super-resolution image reconstruction method and a device. Since the super-resolution image reconstruction method fully considers internal relationship between local pixels of an original image, detailed information of an image can be better maintained, while problems of aliasing, blurring, and graininess are significantly reduced, and display effect of the original image after stretching is improved.

10 Claims, 4 Drawing Sheets

(56) References Cited

U.S. PATENT DOCUMENTS

| | | | | |
|---|---|---|---|---|
| 2002/0097921 | A1* | 7/2002 | Wakisawa | G06T 3/4007 |
| | | | | 348/E7.003 |
| 2016/0225125 | A1* | 8/2016 | Zhang | G06T 3/4007 |
| 2016/0379533 | A1* | 12/2016 | Guo | H04N 13/324 |
| | | | | 345/694 |
| 2017/0162102 | A1* | 6/2017 | Liu | G09G 3/2074 |
| 2024/0046414 | A1* | 2/2024 | Liu | G06T 3/4023 |

FOREIGN PATENT DOCUMENTS

| | | | | |
|---|---|---|---|---|
| CN | 101226634 | | 7/2008 | |
| CN | 101226634 A | * | 7/2008 | |
| CN | 103810675 | | 5/2014 | |
| CN | 103810678 A | * | 5/2014 | |
| CN | 108960037 | | 12/2018 | |
| CN | 108960037 A | * | 12/2018 | G06F 3/015 |
| CN | 112053284 | | 12/2020 | |
| CN | 112053284 A | * | 12/2020 | |
| CN | 112508793 | | 3/2021 | |
| EP | 0574245 | | 12/1993 | |
| EP | 0574245 A2 | * | 12/1993 | |
| JP | 2012-083830 | | 4/2012 | |
| JP | 2012083830 A | * | 4/2012 | |
| WO | WO 00/41386 | | 7/2000 | |
| WO | WO-0041386 A2 | * | 7/2000 | G06T 3/4007 |
| WO | WO 2009/078437 | | 6/2009 | |
| WO | WO-2009078437 A1 | * | 6/2009 | G06T 3/40 |
| WO | WO-2012147630 A1 | * | 11/2012 | G06T 3/4053 |

OTHER PUBLICATIONS

International Search Report and the Written Opinion Dated Mar. 22, 2022 From the International Searching Authority Re. Application No. PCT/CN2021/107498 and Its Translaton Into English. (13 Pages).

* cited by examiner

SUPER-RESOLUTION IMAGE RECONSTRUCTION METHOD AND DEVICE

RELATED APPLICATIONS

This application is a National Phase of PCT Patent Application No. PCT/CN2021/107498 having International filing date of Jul. 21, 2021, which claims the benefit of priority of Chinese Patent Application No. 202110702940.5 filed on Jun. 24, 2021. The contents of the above applications are all incorporated by reference as if fully set forth herein in their entirety.

FILED AND BACKGROUND OF THE INVENTION

The present disclosure relates to the field of display technology, in particular to a super-resolution image reconstruction method and a device.

With continuous advancement of display technology, display panels with super-large size and super-resolution have become available. For example, following 4K display panels, 8K display panels have been gradually mass-produced. However, due to limitations of network bandwidth, camera equipment, and video codec technology, the 8K display panels have great shortcomings in terms of film sources. Previous 8K TVs usually stretched video signals with a resolution of less than 8K directly to 8K resolution. For example, each pixel in a 4K video signal is stretched 2*2 times to correspond to four pixels in a display panel with the 8K resolution. However, display effect of such 8K resolution is extremely poor.

Currently, each pixel in the 4K video signal can only correspond to one pixel in the display panel with the 8K resolution. For example, an image is regarded as a matrix, row and column values of the matrix correspond to one pixel, and a matrix element is a gray scale value of the pixel, and a pixel in an i-th row and j-th column of an original image matrix of a 4K video is assigned to [2i−1,2j−1] of a target matrix of the 8K resolution (i and j are both positive integers); in order to achieve an effect of doubling the original image matrix to the target matrix, a neighbor replacement algorithm, a bilinear interpolation algorithm, a cubic interpolation algorithm, or other algorithms is adopted to fill in blank pixels in the target matrix of the 8K resolution. However, these algorithms either do not fully consider inherent relationship between neighboring pixels, resulting in jagged, blurred, and grainy display problems, or have complex calculation process and low efficiency, resulting in poor real-time performance.

Current super-resolution image reconstruction methods either do not fully consider inherent relationship between adjacent pixels, resulting in jagged, blurred, and grainy display problems, or have complex calculation process and low efficiency, resulting in poor real-time performance.

Therefore, it is necessary to propose a new super-resolution image reconstruction method that can achieve clear display, simple calculation, and better real-time performance.

SUMMARY OF THE INVENTION

To solve the above problems, the present disclosure provides a super-resolution image reconstruction method and a device.

In a first aspect, the present disclosure provides a super-resolution image reconstruction method, which comprises:

S1, collecting an original image to be reconstructed, the original image comprises a plurality of pixels arranged in an array; wherein each row of pixels comprises a plurality of row pixel groups composed of continuous pixels, and each column of pixels comprises a plurality of column pixel groups composed of continuous pixels;

S2, obtaining, according to visible relationship between pixels in each of the plurality of row pixel groups, gray scale values corresponding to newly added row pixels between two adjacent pixels in each row of pixels, and determining, according to visible relationship between pixels in each of the plurality of column pixel groups, gray scale values corresponding to newly added column pixels between two adjacent pixels in each column of pixels;

S3, determining, according to the newly added row pixels and the newly added column pixels, a gray scale value corresponding to a newly added central pixel in a surrounding area composed of newly added row pixels between two adjacent pixels in two adjacent rows and newly added column pixels between two adjacent pixels in two adjacent columns; wherein the two adjacent pixels in the two adjacent rows and the two adjacent pixels in the two adjacent columns overlap with each other; and S4, inserting the newly added row pixels between two adjacent pixels in each row of pixels, inserting the newly added column pixels between adjacent two pixels in each column of pixels, and inserting a central pixel in a surrounding area composed of the newly added row pixels and the newly added column pixels, in order to obtain a super-resolution image reconstructed corresponding to the original image.

Preferably, in the step S2, obtaining, according to the visible relationship between the pixels in each of the plurality of row pixel groups, the gray scale values corresponding to the newly added row pixels between the two adjacent pixels in each row of pixels, comprises:

S21, determining, according to a gray scale value of each pixel and a row position of each pixel in a pixel row, at least one visible row pixel of each pixel in a row pixel group; wherein each pixel and the at least one the visible row pixel corresponding to each pixel satisfy a preset visible condition; and S22, according to the gray scale value and the row position of each pixel, and a gray scale value and a row position of the at least one visible row pixel corresponding to each pixel, obtaining a gray scale value corresponding to a newly added row pixel of any row position between two adjacent pixels in each row of pixels.

Preferably, in the step S2, determining, according to the visible relationship between the pixels in each of the plurality of column pixel groups, the gray scale values corresponding to the newly added column pixels between the two adjacent pixels in each column of pixels, comprises:

S21', determining, according to a gray scale value of each pixel and a column position of each pixel in a pixel column, at least one visible column pixel of each pixel in a column pixel group; wherein each pixel and the at least one visible column pixel corresponding to each pixel satisfy a preset visible condition; and S22', according to the gray scale value and the column position of each pixel, and a gray scale value and a column position of the at least one visible column pixel corresponding to each pixel, obtaining a gray scale value corresponding to a newly added column pixel at any column position between two adjacent pixels in each column of pixels.

Preferably, in the step S21, the preset visible condition comprises: gray scale values of pixels located between the row position of each pixel and the row position of the at least one visible row pixel corresponding to each pixel are all less than the gray scale value of each pixel and the gray scale value of each visible row pixel.

Preferably, in the step S21', the preset visible condition comprises: gray scale values of pixels between the column position of each pixel and the column position of the at least one column pixel corresponding to each pixel are all less than the gray scale value of each pixel and the gray scale value of each visible column pixel.

Preferably, the step S22 comprises:

S221, according to the gray scale value and the row position of each pixel, and the gray scale value and the row position of the at least one visible row pixel corresponding to each pixel, establishing a visible function relationship between each pixel and each corresponding visible row pixel respectively;

S222, selecting, according to the visible function relationship between each pixel and each corresponding visible row pixel, a visible function relationship associated with two adjacent pixels in each row of pixels; wherein the visible function relationship associated with the two adjacent pixels is a visible function relationship that has an intersection with row positions between the two adjacent pixels; and S223, obtaining the gray scale value corresponding to the newly added row pixel at any row position between the two adjacent pixels according to the visible function relationship associated with the two adjacent pixels.

Preferably, the step S22' comprises:

S221', according to the gray scale value and the column position of each pixel, and the gray scale value and the column position of the visible column pixel corresponding to each pixel, establishing a visible function relationship between each pixel and each corresponding visible column pixel respectively;

S222', selecting, according to the visible function relationship between each pixel and each corresponding visible column pixel, a visible function relationship associated with two adjacent pixels in each column of pixels; wherein the visible function relationship associated with the two adjacent pixels is a visible function relationship that has an intersection with column positions between the two adjacent pixels; and S223', obtaining the gray scale value corresponding to the newly added column pixel at any column position between the adjacent two pixels according to the visible function relationship associated with the two adjacent pixels.

Preferably, the step S223 comprises:

according to any row position between the two adjacent pixels, and all the visible function relationships associated with the two adjacent pixels, obtaining a plurality of initial gray scale values corresponding to the newly added row pixel at any row position; and using an average value of the plurality of initial gray scale values as the gray scale value corresponding to the newly added row pixel at any row position.

Preferably, the step S223' comprises:

according to any column position between the two adjacent pixels and all the visible function relationships associated with the two adjacent pixels, obtaining a plurality of initial gray scale values corresponding to the newly added column pixel at any column position; and using an average value of the plurality of initial gray scale values as the gray scale value corresponding to the newly added column pixel at any column position.

Preferably, the step S3 comprises: using an average value of gray scale values of newly added row pixels between the two adjacent pixels in the two adjacent rows and gray scale values of the newly added column pixels between the two adjacent pixels in the two adjacent columns as the gray scale value corresponding to the newly added central pixel.

Preferably, the number of the newly added row pixels inserted between the two adjacent pixels of each row of pixels is the same, and/or the number of the newly added column pixels inserted between the two adjacent pixels is the same.

In a second aspect, the present disclosure provides a super-resolution image reconstruction device, comprising:

an acquisition module configured to collect an original image to be reconstructed, the original image comprises a plurality of pixels arranged in an array; wherein each row of pixels comprises a plurality of row pixel groups composed of continuous pixels, and each column of pixels comprises a plurality of column pixel groups composed of continuous pixels;

a newly added row and column pixel module configured to obtain, according to visible relationship between pixels in each of the plurality of row pixel groups, gray scale values corresponding to newly added row pixels between two adjacent pixels in each row of pixels, and determine, according to visible relationship between pixels in each of the plurality of column pixel groups, gray scale values corresponding to newly added column pixels between two adjacent pixels in each column of pixels;

a newly added central pixel module configured to determine, according to the newly added row pixels and the newly added column pixels, a gray scale value corresponding to a newly added central pixel in a surrounding area composed of newly added row pixels between two adjacent pixels in two adjacent rows and newly added column pixels between two adjacent pixels in two adjacent columns; wherein the two adjacent pixels in the two adjacent rows and the two adjacent pixels in the two adjacent columns overlap with each other; and an insertion module configured to insert the newly added row pixels between two adjacent pixels in each row of pixels, insert the newly added column pixels between adjacent two pixels in each column of pixels, and insert a central pixel in a surrounding area composed of the newly added row pixels and the newly added column pixels, in order to obtain a super-resolution image reconstructed corresponding to the original image.

Preferably, the newly added row and column pixel module comprises:

a row pixel visible relationship unit configured to determine, according to a gray scale value of each pixel and a row position of each pixel in a pixel row, at least one visible row pixel of each pixel in a row pixel group; wherein each pixel and the at least one the visible row pixel corresponding to each pixel satisfy a preset visible condition; and a newly added row pixel gray scale value acquisition unit configured to obtain a gray scale value corresponding to a newly added row pixel of any row position between two adjacent pixels in each row of pixels, according to the gray scale value and the row position of each pixel, and a gray scale value and a row position of the at least one visible row pixel corresponding to each pixel.

Preferably, the newly added row and column pixel module comprises:
  a column pixel visible relationship unit configured to determine, according to a gray scale value of each pixel and a column position of each pixel in a pixel column, at least one visible column pixel of each pixel in a column pixel group; wherein each pixel and the at least one visible column pixel corresponding to each pixel satisfy a preset visible condition; and
  a newly added column pixel gray scale value acquisition unit configured to obtain a gray scale value corresponding to a newly added column pixel at any column position between two adjacent pixels in each column of pixels, according to the gray scale value and the column position of each pixel, and a gray scale value and a column position of the at least one visible column pixel corresponding to each pixel.

Preferably, the newly added row pixel gray scale value acquisition unit is configured to:
  according to the gray scale value and the row position of each pixel, and the gray scale value and the row position of the at least one visible row pixel corresponding to each pixel, establish a visible function relationship between each pixel and each corresponding visible row pixel respectively;
  select, according to the visible function relationship between each pixel and each corresponding visible row pixel, a visible function relationship associated with two adjacent pixels in each row of pixels; wherein the visible function relationship associated with the two adjacent pixels is a visible function relationship that has an intersection with row positions between the two adjacent pixels; and
  obtain the gray scale value corresponding to the newly added row pixel at any row position between the two adjacent pixels according to the visible function relationship associated with the two adjacent pixels.

Preferably, the newly added column pixel gray scale value acquisition unit is configured to:
  according to the gray scale value and the column position of each pixel, and the gray scale value and the column position of the visible column pixel corresponding to each pixel, establish a visible function relationship between each pixel and each corresponding visible column pixel respectively;
  select, according to the visible function relationship between each pixel and each corresponding visible column pixel, a visible function relationship associated with two adjacent pixels in each column of pixels; wherein the visible function relationship associated with the two adjacent pixels is a visible function relationship that has an intersection with column positions between the two adjacent pixels; and
  obtain the gray scale value corresponding to the newly added column pixel at any column position between the adjacent two pixels according to the visible function relationship associated with the two adjacent pixels.

Preferably, the newly added row pixel gray scale value acquisition unit configured to obtain the gray scale value corresponding to the newly added row pixel at any row position between the two adjacent pixels according to the visible function relationship associated with the two adjacent pixels further comprises:
  according to any row position between the two adjacent pixels, and all the visible function relationships associated with the two adjacent pixels, obtaining a plurality of initial gray scale values corresponding to the newly added row pixel at any row position; and
  using an average value of the plurality of initial gray scale values as the gray scale value corresponding to the newly added row pixel at any row position.

Preferably, the newly added column pixel gray scale value acquisition unit configured to obtain the gray scale value corresponding to the newly added column pixel at any column position between the two adjacent pixels according to the visible function relationship associated with the two adjacent pixels further comprises:
  according to any column position between the two adjacent pixels and all the visible function relationships associated with the two adjacent pixels, obtaining a plurality of initial gray scale values corresponding to the newly added column pixel at any column position; and
  using an average value of the plurality of initial gray scale values as the gray scale value corresponding to the newly added column pixel at any column position.

Preferably, the newly added central pixel module is configured to:
  select the two adjacent pixels in the two adjacent rows and the two adjacent pixels in the two adjacent columns that overlap each other; and
  use an average value of gray scale values of newly added row pixels between the two adjacent pixels in the two adjacent rows and gray scale values of the newly added column pixels between the two adjacent pixels in the two adjacent columns as the gray scale value corresponding to the newly added central pixel.

In a third aspect, the present disclosure provides an electronic device including a memory, a processor, and a computer program stored in the memory and capable of running on the processor. The processor implements the above-mentioned super-resolution image reconstruction method when the program is executed.

In a fourth aspect, the present disclosure provides a computer-readable storage medium on which a computer program is stored, and when the computer program is executed by a processor, the steps of the above-mentioned super-resolution image reconstruction method are realized.

The present disclosure provides a super-resolution image reconstruction method and a device. According to the visible relationship between each pixel in the original image and other pixels in the row pixel group or column pixel group, the gray scale value corresponding to the newly added pixel needed to be inserted between every two adjacent pixels of each row or each column in the original image is obtained, and the newly added pixel of the gray scale value is inserted into the two adjacent pixels in each row or each column, and thus the super-resolution reconstruction image is obtained from the original image. Since the super-resolution image reconstruction method fully considers internal relationship between local pixels of the original image, it can better maintain image detail information, while problems of aliasing, blurring, and graininess are significantly reduced, and display effect of the original image after stretching is improved. In addition, the method of the present disclosure is simple in principle, small in calculation amount, and high in real-time processing, which ensures high-speed signal transmission and efficient system operation.

DESCRIPTION OF SPECIFIC EMBODIMENTS OF THE INVENTION

In order to make purposes, technical solutions, and effects of the present disclosure clearer, the following further describes the present disclosure in detail with reference to the accompanying drawings and embodiments. It should be understood that the specific embodiments described here are only used to explain the present disclosure, and are not used to limit the present disclosure.

Figure 1:
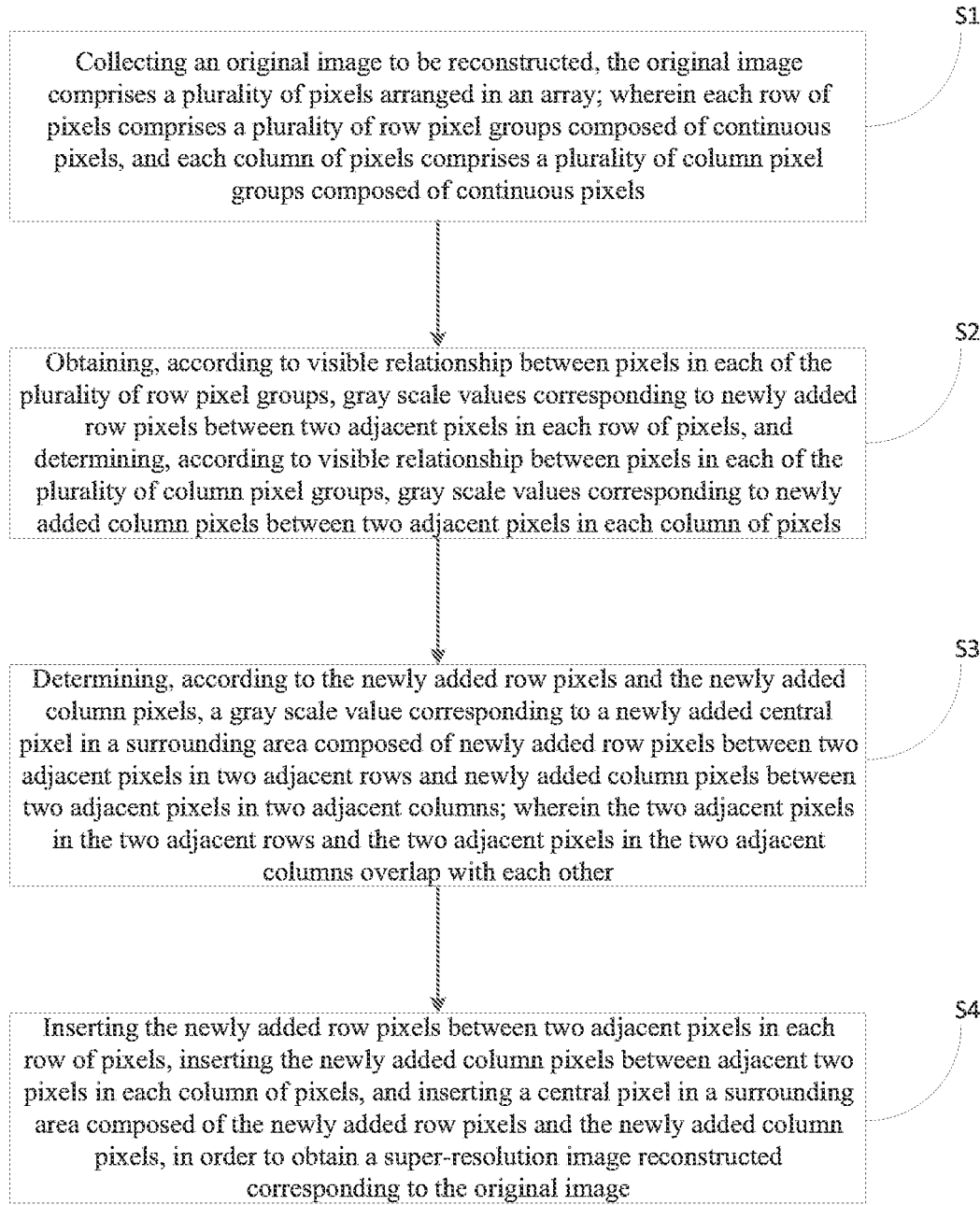
FIG. 1 is a schematic flowchart of a super-resolution image reconstruction method provided by an embodiment of the present disclosure.

FIG. 1 is a schematic flowchart of a super-resolution image reconstruction method provided by an embodiment of the present disclosure. As shown in FIG. 1, an embodiment of the present disclosure provides a super-resolution image reconstruction method, which comprises:

S1. Collecting an original image to be reconstructed, and the original image comprises a plurality of pixels arranged in an array; wherein each row of pixels comprises a plurality of row pixel groups composed of continuous pixels, and each column of pixels comprises a plurality of column pixel groups composed of continuous pixels.

Wherein, continuous means that the pixels in each pixel group are pixels sequentially arranged in each row or column, that is, each pixel and adjacent pixels in a same row constitute a row pixel group, and each pixel and adjacent pixels in a same column constitute a column pixel group.

Specifically, in order to fully consider inherent relationship between adjacent pixels, each row of pixels is divided into a plurality of row pixel groups, and each row pixel group is composed of a first preset number of continuous pixels. Similarly, each column of pixels is divided into a plurality of column pixel groups, and each column pixel group is composed of a second preset number of continuous pixels, so as to facilitate determination of relationship between each pixel and adjacent pixels thereof in each row pixel group and each column pixel group in subsequent steps, and further facilitate to fill newly added row pixels or newly added column pixels with best gray scale values between two adjacent pixels after the original image is stretched.

It can be understood that, in fact, the number of continuous pixels included between each row pixel group, between each column pixel group, or between a row pixel group and a column pixel group may be the same or different. Therefore, the first preset number and the second preset number are not constant values, and the first preset number and the second preset number are not necessarily the same, specific values of the first preset number and the second preset number may be set according to a key reconstruction part and a non-key reconstruction part of the original image. For example, if a pixel group of the key reconstruction part comprises more pixels, the first preset number and the second preset number are larger, such as 6-10, and if a pixel group of the non-key reconstruction part comprises fewer pixels, the first preset number and the second preset number are smaller, such as 1-5. In addition, each pixel does not necessarily belong to only one row pixel group or one column pixel group, that is, two adjacent pixel groups may comprise overlapping pixels, as long as specific pixels included in each pixel group are determined in advance.

S2. Obtaining gray scale values corresponding to newly added row pixels between two adjacent pixels in each row of pixels according to visible relationship between the pixels in each row pixel group, and obtaining gray scale values corresponding to newly added column pixels between two adjacent pixels in each column according to visible relationship between the pixels in each column pixel group.

Specifically, there is a visible relationship or a non-visible relationship between pixels located in a same row or a same column, and a gray scale value of a pixel that has a visible relationship with each pixel in each pixel group is selected as a basis for determining a gray scale value of a newly added pixel that needs to be inserted between each two adjacent pixels, thereby establishing the internal relationship between adjacent pixels, so as to determine the gray scale value of the newly added pixel that needs to be inserted between each two adjacent pixels according to a visible relationship between each two adjacent pixels and adjacent pixels thereof in a same pixel group.

S3. Determining a gray scale value corresponding to a newly added central pixel in a surrounding area composed of newly added row pixels between two adjacent pixels in two adjacent rows and newly added column pixels between two adjacent pixels in two adjacent columns according to the newly added row pixels and the newly added column pixels, wherein the two adjacent pixels in the two adjacent rows overlap with the two adjacent pixels in the two adjacent columns.

Figure 5:
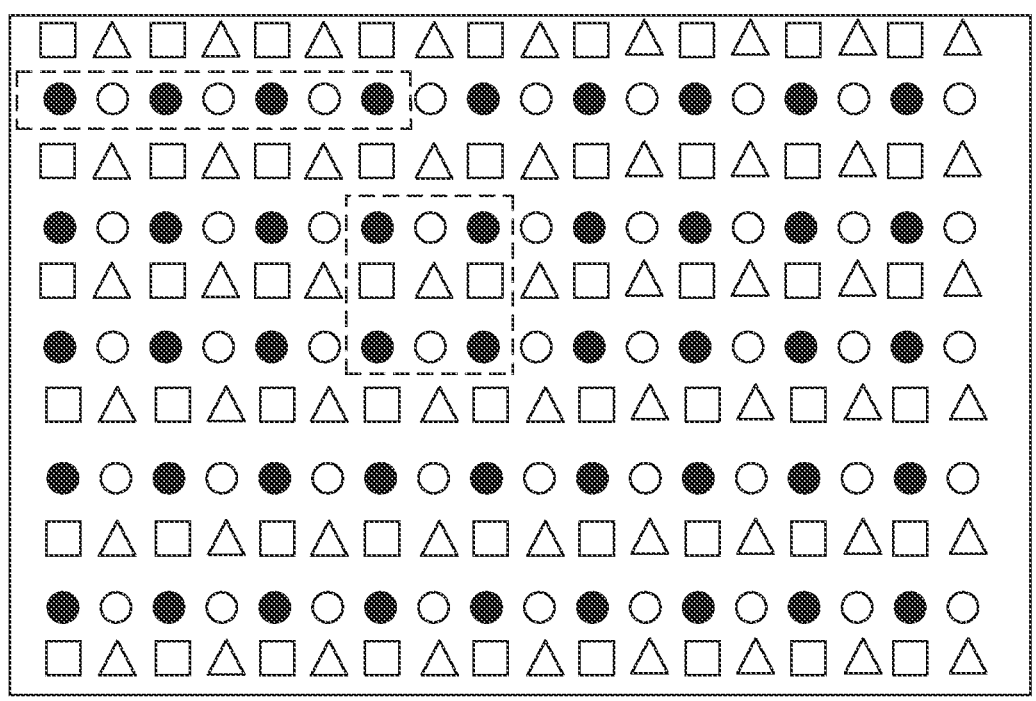
FIG. 5 is a schematic diagram of a process of reconstructing the original image into a super-resolution image provided by an embodiment of the present disclosure.

Specifically, as shown in FIG. 5, black dots are pixels of the original image, white dots are the newly added row pixels, rectangles are the newly added column pixels, and triangles are the newly added central pixels. FIG. 5 is a schematic diagram of a super resolution image obtained by enlarging the original image by 2 times. After inserting the newly added row pixels between two adjacent pixels in each row and inserting the newly added column pixels between two adjacent column pixels in each column, for four pixels overlapped with two adjacent row pixels in two adjacent rows and two adjacent pixels in two adjacent columns (such as a square dashed frame in FIG. 5), there are blank pixels in a surrounding area composed of the newly added row pixels and the newly added column pixels, so that a newly added central pixel is needed to be inserted in the surrounding area. In this embodiment, the gray scale value of the newly added central pixel is determined by gray scale values of the newly added row pixels and the newly added column pixels surrounding the newly added central pixel.

S4. Inserting the newly added row pixels between two adjacent pixels in each row of pixels, inserting the newly added column pixels between two adjacent pixels in each column of pixels, and inserting central pixels in surrounding areas of the newly added row pixels and the newly added column pixels to obtain a super-resolution reconstruction image corresponding to the original image.

Specifically, the newly added row pixels of the gray scale values obtained above are inserted between two adjacent pixels of each row of pixels, and the newly added column pixels of the gray scale values obtained above are inserted between two adjacent pixels of each column of pixels, and the newly added central pixels are inserted in the surrounding areas composed of the newly added pixels between two adjacent pixels in two adjacent rows and the newly added pixels between two adjacent pixels in two adjacent columns to reconstruct the original image into the super-resolution image.

In the super-resolution image reconstruction method provided by the embodiment of the present disclosure, according to the visible relationship between each pixel in the original image and other pixels in the same row pixel group or the same column pixel group, obtaining the gray scale values corresponding to the newly added row pixels and the newly added column pixels needed to be inserted between every two adjacent pixels in each row or each column of the original image, determining the gray scale values corresponding to the newly added central pixels in the surrounding areas of two adjacent pixels in two adjacent rows and two adjacent pixel in two adjacent columns that overlap with each other according to the newly added row pixels and the newly added column pixels, inserting the newly added pixels that satisfy corresponding gray scale values between two adjacent pixels in each row or each column, and inserting the newly added central pixels that satisfy corresponding gray scale values in the surrounding areas of the newly added row pixels and the newly added column pixels, thereby obtaining the super-resolution image reconstructed by the original image. Since the super-resolution image reconstruction method fully considers internal relationship between local pixels of the original image, it can better maintain image detail information, while problems of aliasing, blurring, and graininess are significantly reduced, and display effect of the original image after stretching is improved. In addition, the method of the present disclosure is simple in principle, small in calculation amount, and high in real-time processing, which ensures high-speed signal transmission and efficient system operation.

It should be noted that, since the process and steps of filling newly added row pixels between two adjacent pixels of each row of pixels are the same as filling newly added column pixels between two adjacent pixels of each column of pixels, the following embodiment takes filling the newly added row pixels between two adjacent pixels of each row as an example to further illustrate the super-resolution image reconstruction method.

The step S2 of obtaining the gray scale value corresponding to the newly added row pixel between two adjacent pixels in each row according to the visible relationship between the pixels in each row pixel group specifically comprises:

S21. According to a gray scale value of each pixel and a row position of each pixel in a pixel row, determining at least one visible row pixel of each pixel in the row pixel group. Wherein, each pixel and the at least one visible row pixel corresponding to each pixel satisfy a preset visible condition, and the preset visible condition includes: gray scales of pixels between the row position of each pixel and a row position of the visible row pixel corresponding to each pixel are less than the gray scale value of each pixel and a gray scale value of each visible row pixel.

Figure 2:
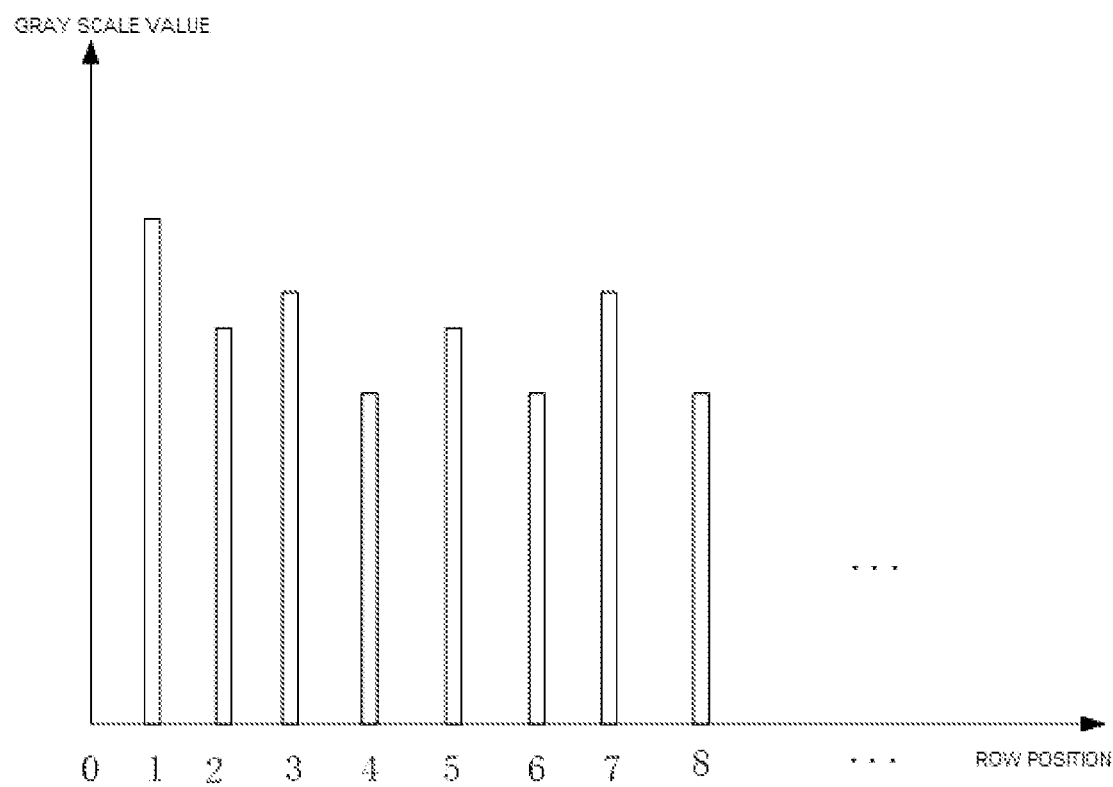
FIG. 2 is a histogram of row position and gray scale value of any row of pixels of an original image provided by an embodiment of the present disclosure.

Specifically, as shown in FIG. 2, the row position of the pixel is taken as the abscissa (a value of the row position can be set by yourself; the row positions 1, 2, 3 . . . in this embodiment respectively represent the first, second, third . . . pixels in a same row), the gray scale value of the pixel is taken as the ordinate, and a histogram of row position-gray scale value is drawn. A visible relationship judgment criterion of the embodiment of the present disclosure is: if two pixels located in a same row are visible, any row position between the two pixels satisfies the following formula:

$$\frac{X_m - X_j}{X_i - X_j} < \frac{P_j - P_m}{P_j - P_i}$$

Wherein, (Xi, Pi) and (Xj, Pj) are row position value and gray scale value of two pixels in a same row respectively, (Xm, Pm) is row position and gray scale value of a pixel in any row position between the two pixels.

The meaning of the above formula is: a gray scale value of a pixel located in any row position between two pixels with a visible relationship in a same row is less than gray scale values of the two pixels, that is, a connection line between gray scale values of pixels in the visible relationship in FIG. 2 is not blocked by gray scale value histograms of other pixels, and this is used as the preset visible condition. On the contrary, if a connection line between gray scale values of two pixels is blocked by gray scale value histograms of other pixels between the two pixels, and there is no visible relationship between the two pixels.

Figure 3:
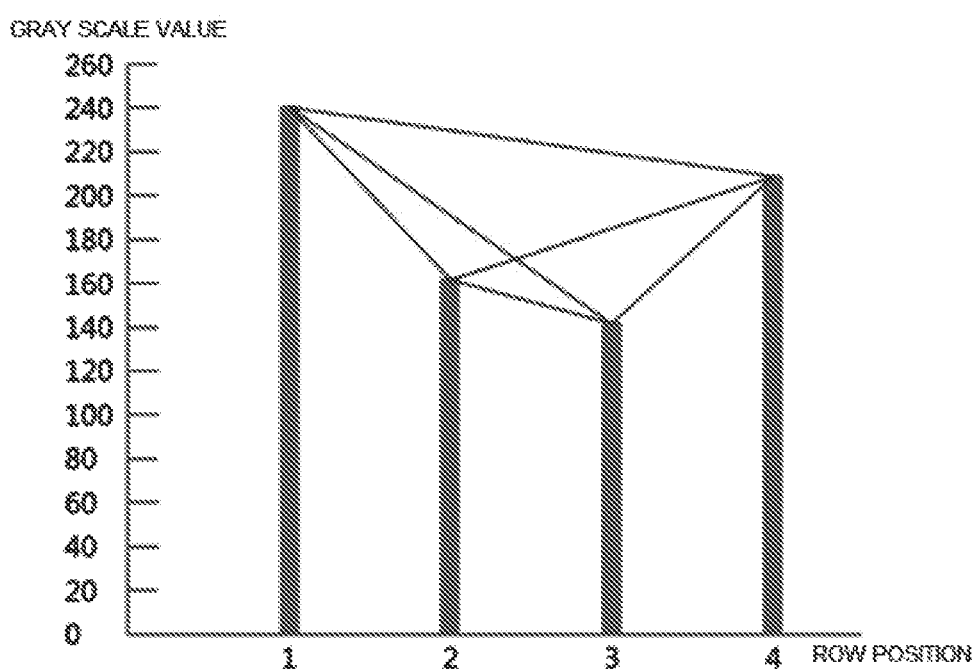
FIG. 3 is a histogram of row position and gray scale value of pixels in a row pixel group of the original image provided by an embodiment of the present disclosure.
Figure 4:
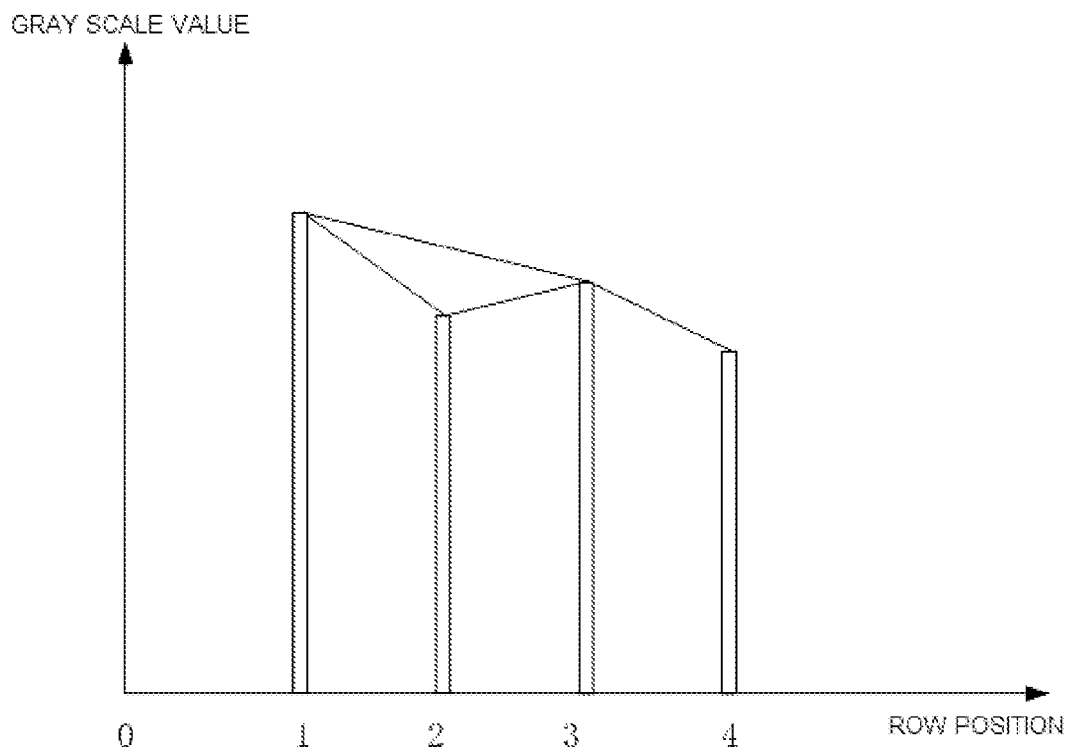
FIG. 4 is a histogram of row position and gray scale value of pixels in another row of pixel group of the original image provided by an embodiment of the present disclosure.

Further, according to the preset visible condition, the at least one visible row pixel of each pixel in the row pixel group is determined, for example: suppose the first preset number is 4, and FIG. 3 and FIG. 4 are two row position-gray scale value histograms of a row pixel group composed by four continuous pixels (such as the rectangular dashed box in FIG. 5) respectively, and row positions of the four continuous pixels are row position 1, row position 2, row position 3, and row position 4, respectively.

As shown in FIG. 3, a pixel at the row position 1 has a visible relationship with pixels at the row position 2, the row position 3, and the row position 4, respectively. Therefore, visible pixels of the pixel at the row position 1 in this row pixel group is pixels at the row position 2, the row position 3, and the row position 4. Similarly, visible pixels of the pixel at the row position 2 in the row pixel group are the pixels at the row position 1, the row position 3, and the row position 4; visible pixels of the pixel at the row position 3 in the row pixel group are the pixels at the row position 1, the row position 2, and the row position 4; and visible pixels of the pixel at the row position 4 in the row pixel group are pixels at the row position 1, the row position 2, and the row position 3.

As shown in FIG. 4, the visible pixels of the pixel at the row position 1 in the row pixel group are the pixels at the row position 2 and the row position 3. Similarly, the visible pixels of the pixel at the row position 2 in the row pixel group are the pixels at the row position 1 and the row position 3; the visible pixels of the pixel at the row position 3 in the row pixel group are the pixels at the row position 1, the row position 2, and the row position 4; and the visible pixels of the pixel at the row position 4 is in the row pixel group is the pixel at the row position 3.

S22: According to the gray scale value and row position of each pixel, and the gray scale value and the row position of the visible row pixel corresponding to each pixel, obtaining a gray scale value corresponding to a newly added row pixel at any row position between two adjacent pixels in each row.

Further, the step S22 specifically comprises:

S221. According to the gray scale value and row position of each pixel, and the gray scale value and row position of the visible row pixel corresponding to each pixel, establishing a visible function relationship between each pixel and each corresponding visible row pixel.

For example, if gray scale values of the pixels at the row position 1, the row position 2, the row position 3, and the row position 4 in FIG. 3 are 240, 160, 140, and 210, respectively, a slope of a line between the pixel at the row position 1 and the pixel at the row position 2 in the histogram is: $(160-240)/(2-1)=-80$, and a visible function relationship between the pixel at the row position 1 and the pixel at the row position 2 is: $P12=-80X12+320$, wherein $X12$ is any row position between the row position 1 and the row position 2, and $P12$ is a gray scale value corresponding to a pixel in any row position between the row position 1 and the row position 2.

Similarly, a visible function relationship between the pixel at the row position 1 and the pixel at the row position 3 is: $P13=-50X13+290$, wherein $X13$ is any row position between the row position 1 and the row position 3, and $P13$ is a gray scale value corresponding to a pixel in any row position between the row position 1 and the row position 3.

A visible function relationship between the pixel at the row position 1 and the pixel at the row position 4 is: $P14=-10X14+250$, wherein $X14$ is any row position between the row position 1 and the row position 3, and $P14$ is a gray scale value corresponding to a pixel in any row position between the row position 1 and the row position 4.

A visible function relationship between the pixel at the row position 2 and the pixel at the row position 3 is: $P23=-20X23+200$, wherein $X23$ is any row position between the row position 2 and the row position 3, and $P23$ is a gray scale value corresponding to a pixel in any row position between the row position 2 and the row position 3.

A visible function relationship between the pixel at the row position 2 and the pixel at the row position 4 is: $P24=25X24+110$, wherein $X24$ is any row position between the row position 2 and the row position 4, and $P24$ is a gray scale value corresponding to a pixel in any row position between the row position 2 and the row position 4.

A visible function relationship between the pixel at the row position 3 and the pixel at the row position 4 is: $P34=70X34-70$, wherein $X34$ is any row position between the row position 3 and the row position 4, and $P34$ is a gray scale value corresponding to a pixel in any row position between the row position 3 and the row position 4.

Similarly, if the gray scale values of the pixels at the row position 1, the row position 2, the row position 3, and the row position 4 in FIG. 4 are 240, 160, 200, and 120, respectively, the visible function relationship between the pixel at the row position 1 and the pixel at the row position 2 is: $P12=-80X12+320$, the visible function relationship between the pixel at the row position 1 and the pixel at the row position 3 is: $P13=-20X13+260$; the visible function relationship between the pixel at the row position 1 and the pixel at the row position 4 is: $P14=-40X14+280$. The visible function relationship between the pixel at the row position 2 and the pixel at the row position 3 is: $P23=40X23+80$.

S222. According to the visible function relationship between each pixel and each corresponding visible row pixel, selecting a visible function relationship associated with two adjacent pixels in each row of pixels. Wherein the visible function relationship associated with the two adjacent pixels is a visible function relationship that has an intersection with row positions between the two adjacent pixels.

Specifically, the visible functional relationship that has intersection with the row positions between the two adjacent pixels means that in the histogram, connection lines between the two adjacent pixels and corresponding visible pixels need to pass through the two adjacent pixels, then a visible function relationship corresponding to the connection lines will be regarded as the visible function relationship associated with the two adjacent pixels.

For example, when inserting a newly added row pixel between the pixel at the row position 1 and the pixel at the row position 2, in FIG. 3, the visible function relationship P12 between the pixel at the row position 1 and the pixel at the row position 2, the visible function relationship P13 between the pixel at the row position 1 and the pixel at the row position 3, and the visible function relationship P14 between the pixel at the row position 1 and the pixel at the row position 4, should be selected as the visible function relationships associated with the pixel at the row position 1 and the pixel at the row position 2. However, in FIG. 4, the visible function relationship P12 between the pixel at the row position 1 and the pixel at the row position 2, and the visible function relationship P13 between the pixel at the row position 1 and the pixel at the row position 3 should be selected as the visible function relationships associated with the pixel at the row position 1 and the pixel at the row position 2.

When inserting a newly added row pixel between the pixel at the row position 2 and the pixel at the row position 3, the visible function relationship P23 between the pixel at the row position 2 and the pixel at the row position 3, the visible function relationship P24 between the pixel at the row position 2 and the pixel at the row position 4, and the visible function relationship P31 between the pixel at the row position 3 and the pixel at the row position 1 (that is, the visible function relationship P13 between the pixel at the row position 1 and the pixel at the row position 3), should be selected in FIG. 3 as the visible function relationships associated with the row position 2 and the row position 3. In addition, the visible function relationship P23 between the pixel at the row position 2 and the pixel at the row position 3, and the visible function relationship P31 between the pixel at the row position 3 and the pixel at the row position 1 should be selected in FIG. 4 as the visible function relationships associated with the row position 2 and the row position 3.

S223. Obtaining a gray scale value corresponding to a newly added row pixel at any row position between the two adjacent pixels according to the visible function relationship associated with the two adjacent pixels.

Further, the step S223 specifically comprises: according to any row position between the two adjacent pixels, and all the visible function relationships associated with the two adjacent pixels, obtaining a plurality of initial gray scale values corresponding to a newly added row pixel at any row position, and an average value of the plurality of initial gray scale values is used as a gray scale value corresponding to a newly added row pixel at any row position.

For example, when inserting a newly row pixel at any row position x between the pixel at the row position 1 and the pixel at the row position 2, in FIG. 3, Px=(P12+P13+P14)/3, and in FIG. 4, Px=(P12+P13)/2, if a row position x=1.5 is selected to insert a newly added row pixel, then in FIG. 3 from x=1.5, P12=200, P13=215, and P14=235 are got, so $P_{1.5}$=(200+215+235)/3=216, and thus a pixel with a gray scale value of 216 is inserted at the position of 1.5; and in FIG. 4, from x=1.5, P12=200 and P13=230 are got, so $P_{1.5}$=(200+230)/2=215, and thus a pixel with a gray scale value of 215 is inserted at the position of 1.5.

When inserting a newly added row pixel at any row position x between the pixel at the row position 2 and the pixel at the row position 3, in FIG. 3, Px=(P23+P24+P31)/3, and in FIG. 4, Px=(P12+P13)/2, if a row position x=2.5 is selected to insert a newly added row pixel, then in FIG. 3 from x=2.5, P23=150, P24=172.5, and P31=165 are got, so $P_{2.5}$=(150+172.5+165)/3=162.5, and thus a pixel with a gray scale value of 162.5 is inserted at the position of 2.5; and in FIG. 4, from x=2.5, P12=120 and P13=210 are got, so $P_{2.5}$=(120+210)/2=165, and thus a pixel with a gray scale value of 165 is inserted at the position of 2.5.

Further, the step S3 specifically comprises:

S31. Selecting two adjacent pixels in two adjacent rows and two adjacent pixels in two adjacent columns that overlap each other.

S32. Taking an average value of gray scale values of newly added row pixels between the two adjacent pixels in the two adjacent rows and gray scale values of newly added column pixels between the two adjacent pixels in the two adjacent columns as the gray scale value corresponding to the newly added center pixel.

Specifically, two adjacent pixels in two adjacent rows and two adjacent pixels in two adjacent columns that overlap each other (for example, four black dots in the dashed frame in FIG. 5) are selected, and newly added row pixels (for example, two white dots in the dashed frame in FIG. 5) and newly added column pixels (for example, two rectangles in the dashed frame in FIG. 5) are inserted, and an average of gray scale values of newly added row pixels between the two adjacent pixels in the two adjacent rows (for example, 2 black dots in the dashed frame in FIG. 5) and gray scale values of newly added column pixels between the two adjacent pixels in the two adjacent columns (for example, two white dots in the dashed frame in FIG. 5) is calculated, and then the average is used as the gray scale of the newly added central pixel (for example, the triangle in the dashed frame in FIG. 5).

It should be noted that, in order to ensure the display uniformity of the reconstructed super-resolution image obtained after the original image is enlarged, the number of newly added row pixels inserted between two adjacent pixels of each row of pixels is the same, and the number of newly added column pixels inserted between two adjacent pixels in each column of pixels is the same. For example, when the original image with 4K resolution is enlarged to an 8K super-resolution image, a newly added row pixel is inserted between every two adjacent pixels in each row, and a newly added column pixel is inserted between every two adjacent pixels in each column, instead of not inserting pixels between some adjacent two pixels, and inserting more than one newly added pixel between partially adjacent two pixels, that is, the number of pixels inserted between every two adjacent pixels is the same, so that the final super-resolution image will have a uniform display effect without unevenness in which some areas are blurred, jagged, and grainy, and some areas are very clear.

It is understandable that, in order to further ensure the display uniformity of the finally obtained super-resolution image, distances between a row position of each newly added pixel and row positions of two adjacent pixels can also be kept the same, for example, the newly added pixel is inserted at a midpoint of the two adjacent pixels.

Figure 6:
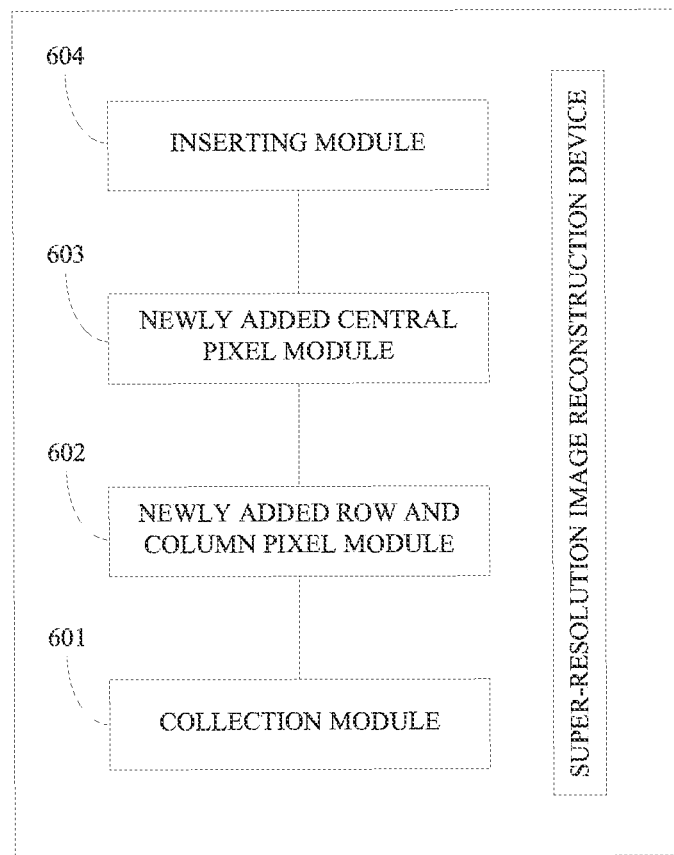
FIG. 6 is a schematic structural diagram of a super-resolution image reconstruction device provided by an embodiment of the present disclosure.

Based on the foregoing embodiment, as shown in FIG. 6, an embodiment of the present disclosure further provides a super-resolution image reconstruction device, comprising:

A collection module 601 configured to collect an original image to be reconstructed, and the original image comprises a plurality of pixels arranged in an array; wherein each row of pixels comprises a plurality of row pixel groups composed of continuous pixels, and each column of pixels comprises a plurality of column pixel groups composed of continuous pixels;

A newly added row and column pixel module 602 configured to obtain gray scale values corresponding to newly added row pixels between two adjacent pixels in each row of pixels according to visible relationship between the pixels in each row pixel group, and obtain gray scale values corresponding to newly added column pixels between two adjacent pixels in each column according to visible relationship between the pixels in each column pixel group;

A newly added central pixel module 603 configured to determine a gray scale value corresponding to a newly added central pixel in a surrounding area composed of newly added row pixels between two adjacent pixels in two adjacent rows and newly added column pixels between two adjacent pixels in two adjacent columns according to the newly added row pixels and the newly added column pixels, wherein the two adjacent pixels in the two adjacent rows overlap with the two adjacent pixels in the two adjacent columns;

An inserting module 604 configured to insert the newly added row pixels between two adjacent pixels in each row of pixels, insert the newly added column pixels between two adjacent pixels in each column of pixels, and insert central pixels in surrounding areas of the newly added row pixels and the newly added column pixels to obtain a super-resolution reconstruction image corresponding to the original image.

The super-resolution image reconstruction device provided by the embodiments of the present disclosure, according to the visible relationship between each pixel in the original image and other pixels in the row pixel group or column pixel group, obtains the gray scale value corresponding to the newly added pixel needed to be inserted between every two adjacent pixels of each row or each column in the original image, and the newly added pixel of the gray scale value is inserted into the two adjacent pixels in each row or each column, and thus the super-resolution reconstruction image is obtained from the original image. Since the super-resolution image reconstruction method fully considers internal relationship between local pixels of the original image, it can better maintain image detail information, while problems of aliasing, blurring, and graininess are significantly reduced, and display effect of the original image after stretching is improved. In addition, the method of the present disclosure is simple in principle, small in calculation amount, and high in real-time processing, which ensures high-speed signal transmission and efficient system operation.

Figure 7:
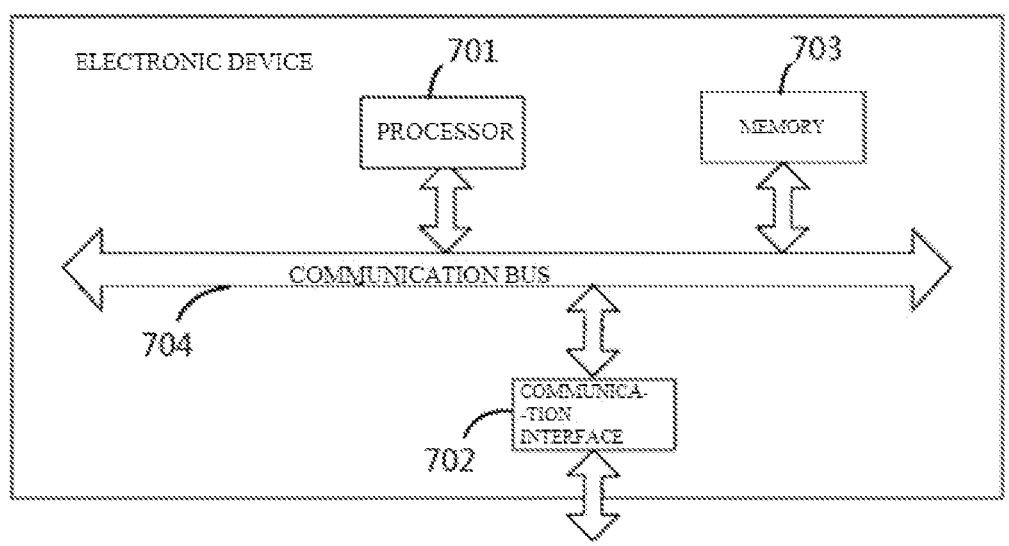
FIG. 7 is a schematic structural diagram of an electronic device provided by an embodiment of the present disclosure.

FIG. 7 is a schematic structural diagram of an electronic device provided by an embodiment of the present disclosure. As shown in FIG. 7, an embodiment of the present disclosure provides an electronic device. The electronic device may comprise a processor 701, a communication interface 702, a memory 703, and a communication bus 704. Wherein the processor 701, the communication interface 702, and the memory 703 communicate with each other through the communication bus 704. The communication interface 702 can be used for information transmission between a server and a smart TV. The processor 701 may call logic instructions in the memory 703 to execute the following methods, for example, including: S1. collecting an original image to be reconstructed, and the original image comprises a plurality of pixels arranged in an array; wherein each row of pixels comprises a plurality of row pixel groups composed of continuous pixels, and each column of pixels comprises a plurality of column pixel groups composed of continuous pixels; S2. obtaining gray scale values corresponding to newly added row pixels between two adjacent pixels in each row of pixels according to visible relationship between the pixels in each row pixel group, and obtaining gray scale values corresponding to newly added column pixels between two adjacent pixels in each column according to visible relationship between the pixels in each column pixel group; S3. determining a gray scale value corresponding to a newly added central pixel in a surrounding area composed of newly added row pixels between two adjacent pixels in two adjacent rows and newly added column pixels between two adjacent pixels in two adjacent columns according to the newly added row pixels and the newly added column pixels, wherein the two adjacent pixels in the two adjacent rows overlap with the two adjacent pixels in the two adjacent columns; S4. inserting the newly added row pixels between two adjacent pixels in each row of pixels, inserting the newly added column pixels between two adjacent pixels in each column of pixels, and inserting central pixels in surrounding areas of the newly added row pixels and the newly added column pixels to obtain a super-resolution reconstruction image corresponding to the original image.

This embodiment also provides a non-transitory computer-readable storage medium, the non-transitory computer-readable storage medium stores computer instructions that allow the computer to execute the methods provided by the foregoing method embodiments, such as comprising: S1. collecting an original image to be reconstructed, and the original image comprises a plurality of pixels arranged in an array; wherein each row of pixels comprises a plurality of row pixel groups composed of continuous pixels, and each column of pixels comprises a plurality of column pixel groups composed of continuous pixels; S2. obtaining gray scale values corresponding to newly added row pixels between two adjacent pixels in each row of pixels according to visible relationship between the pixels in each row pixel group, and obtaining gray scale values corresponding to newly added column pixels between two adjacent pixels in each column according to visible relationship between the pixels in each column pixel group; S3. determining a gray scale value corresponding to a newly added central pixel in a surrounding area composed of newly added row pixels between two adjacent pixels in two adjacent rows and newly added column pixels between two adjacent pixels in two adjacent columns according to the newly added row pixels and the newly added column pixels, wherein the two adjacent pixels in the two adjacent rows overlap with the two adjacent pixels in the two adjacent columns; S4. inserting the newly added row pixels between two adjacent pixels in each row of pixels, inserting the newly added column pixels between two adjacent pixels in each column of pixels, and inserting central pixels in surrounding areas of the newly added row pixels and the newly added column pixels to obtain a super-resolution reconstruction image corresponding to the original image.

It can be understood that, for those of ordinary skill in the art, equivalent replacements or changes can be made according to the technical solution of the present disclosure and its inventive concept, and all these changes or replacements shall fall within the protection scope of the appended claims of the present disclosure.

What is claimed is:

1. A super-resolution image reconstruction method, comprising:

S1, collecting an original image to be reconstructed, the original image comprising a plurality of pixels arranged in an array; wherein each row of pixels comprises a plurality of row pixel groups composed of continuous pixels, and each column of pixels comprises a plurality of column pixel groups composed of continuous pixels;

S2, obtaining, according to visible relationship between pixels in each of the plurality of row pixel groups, gray scale values corresponding to newly added row pixels between two adjacent pixels in each row of pixels, and determining, according to visible relationship between pixels in each of the plurality of column pixel groups, gray scale values corresponding to newly added column pixels between two adjacent pixels in each column of pixels;

S3, determining, according to the newly added row pixels and the newly added column pixels, a gray scale value corresponding to a newly added central pixel in a surrounding area composed of newly added row pixels between two adjacent pixels in two adjacent rows and newly added column pixels between two adjacent pixels in two adjacent columns; wherein the two adjacent pixels in the two adjacent rows and the two adjacent pixels in the two adjacent columns overlap with each other; and S4, inserting the newly added row pixels between two adjacent pixels in each row of pixels, inserting the newly added column pixels between adjacent two pixels in each column of pixels, and inserting the central pixel in the surrounding area composed of the newly added row pixels and the newly added column pixels, in order to obtain a super-resolution image reconstructed corresponding to the original image;

wherein the step S2 of obtaining, according to the visible relationship between the pixels in each of the plurality of row pixel groups, the gray scale values corresponding to the newly added row pixels between the two adjacent pixels in each row of pixels, specifically comprises:

S21, determining, according to a gray scale value of each pixel and a row position of each pixel in a pixel row, at least one visible row pixel of each pixel in a row pixel group; wherein each pixel and the at least one the visible row pixel corresponding to each pixel satisfy a preset visible condition; and S22, according to the gray scale value and the row position of each pixel, and a gray scale value and a row position of the at least one visible row pixel corresponding to each pixel, obtaining a gray scale value corresponding to a newly added row pixel of any row position between two adjacent pixels in each row of pixels;

wherein in the step S21, the preset visible condition comprises: gray scale values of pixels located between the row position of each pixel and the row position of the at least one visible row pixel corresponding to each pixel are all less than the gray scale value of each pixel and the gray scale value of each visible row pixel.

2. The super-resolution image reconstruction method according to claim 1, wherein the step S22 specifically comprises:
S221, according to the gray scale value and the row position of each pixel, and the gray scale value and the row position of the at least one visible row pixel corresponding to each pixel, establishing a visible function relationship between each pixel and each corresponding visible row pixel, respectively;
S222, selecting, according to the visible function relationship between each pixel and each corresponding visible row pixel, a visible function relationship associated with two adjacent pixels in each row of pixels; wherein the visible function relationship associated with the two adjacent pixels is a visible function relationship that has an intersection with row positions between the two adjacent pixels; and
S223, obtaining the gray scale value corresponding to the newly added row pixel at any row position between the two adjacent pixels according to the visible function relationship associated with the two adjacent pixels.

3. The super-resolution image reconstruction method according to claim 2, wherein the step S223 specifically comprises:
according to any row position between the two adjacent pixels, and all the visible function relationships associated with the two adjacent pixels, obtaining a plurality of initial gray scale values corresponding to the newly added row pixel at any row position; and
using an average value of the plurality of initial gray scale values as the gray scale value corresponding to the newly added row pixel at any row position.

4. The super-resolution image reconstruction method according to claim 1, wherein the step S3 specifically comprises:
S31, selecting the two adjacent pixels in the two adjacent rows and the two adjacent pixels in the two adjacent columns that overlap each other; and
S32, using an average value of gray scale values of newly added row pixels between the two adjacent pixels in the two adjacent rows and gray scale values of the newly added column pixels between the two adjacent pixels in the two adjacent columns as the gray scale value corresponding to the newly added central pixel.

5. The super-resolution image reconstruction method according to claim 1, wherein a number of the newly added row pixels inserted between the two adjacent pixels of each row of pixels is the same, and a number of the newly added column pixels inserted between the two adjacent pixels is the same.

6. A super-resolution image reconstruction method, comprising:
S1, collecting an original image to be reconstructed, the original image comprising a plurality of pixels arranged in an array; wherein each row of pixels comprises a plurality of row pixel groups composed of continuous pixels, and each column of pixels comprises a plurality of column pixel groups composed of continuous pixels;
S2, obtaining, according to visible relationship between pixels in each of the plurality of row pixel groups, gray scale values corresponding to newly added row pixels between two adjacent pixels in each row of pixels, and determining, according to visible relationship between pixels in each of the plurality of column pixel groups, gray scale values corresponding to newly added column pixels between two adjacent pixels in each column of pixels;
S3, determining, according to the newly added row pixels and the newly added column pixels, a gray scale value corresponding to a newly added central pixel in a surrounding area composed of newly added row pixels between two adjacent pixels in two adjacent rows and newly added column pixels between two adjacent pixels in two adjacent columns; wherein the two adjacent pixels in the two adjacent rows and the two adjacent pixels in the two adjacent columns overlap with each other; and
S4, inserting the newly added row pixels between two adjacent pixels in each row of pixels, inserting the newly added column pixels between adjacent two pixels in each column of pixels, and inserting the central pixel in the surrounding area composed of the newly added row pixels and the newly added column pixels, in order to obtain a super-resolution image reconstructed corresponding to the original image;
wherein the step S2 of determining, according to the visible relationship between the pixels in each of the plurality of column pixel groups, the gray scale values corresponding to the newly added column pixels between the two adjacent pixels in each column of pixels, specifically comprises:
S21', determining, according to a gray scale value of each pixel and a column position of each pixel in a pixel column, at least one visible column pixel of each pixel in a column pixel group; wherein each pixel and the at least one visible column pixel corresponding to each pixel satisfy a preset visible condition; and
S22', according to the gray scale value and the column position of each pixel, and a gray scale value and a column position of the at least one visible column pixel corresponding to each pixel, obtaining a gray scale value corresponding to a newly added column pixel at any column position between two adjacent pixels in each column of pixels;
wherein in the step S21', the preset visible condition comprises: gray scale values of pixels between the column position of each pixel and the column position of the at least one column pixel corresponding to each pixel are all less than the gray scale value of each pixel and the gray scale value of each visible column pixel.

7. The super-resolution image reconstruction method according to claim 6, wherein the step S22' specifically comprises:
S221', according to the gray scale value and the column position of each pixel, and the gray scale value and the column position of the visible column pixel corresponding to each pixel, establishing a visible function relationship between each pixel and each corresponding visible column pixel, respectively;
S222', selecting, according to the visible function relationship between each pixel and each corresponding visible column pixel, a visible function relationship associated with two adjacent pixels in each column of pixels; wherein the visible function relationship associated with the two adjacent pixels is a visible function relationship that has an intersection with column positions between the two adjacent pixels; and
S223', obtaining the gray scale value corresponding to the newly added column pixel at any column position between the adjacent two pixels according to the visible function relationship associated with the two adjacent pixels.

8. The super-resolution image reconstruction method according to claim 7, wherein the step S223' specifically comprises:

according to any column position between the two adjacent pixels and all the visible function relationships associated with the two adjacent pixels, obtaining a plurality of initial gray scale values corresponding to the newly added column pixel at any column position; and using an average value of the plurality of initial gray scale values as the gray scale value corresponding to the newly added column pixel at any column position.

9. A super-resolution image reconstruction device, comprising:

a collection module configured to collect an original image to be reconstructed, the original image comprising a plurality of pixels arranged in an array; wherein each row of pixels comprises a plurality of row pixel groups composed of continuous pixels, and each column of pixels comprises a plurality of column pixel groups composed of continuous pixels;

a newly added row and column pixel module configured to obtain, according to visible relationship between pixels in each of the plurality of row pixel groups, gray scale values corresponding to newly added row pixels between two adjacent pixels in each row of pixels, and determine, according to visible relationship between pixels in each of the plurality of column pixel groups, gray scale values corresponding to newly added column pixels between two adjacent pixels in each column of pixels;

a newly added central pixel module configured to determine, according to the newly added row pixels and the newly added column pixels, a gray scale value corresponding to a newly added central pixel in a surrounding area composed of newly added row pixels between two adjacent pixels in two adjacent rows and newly added column pixels between two adjacent pixels in two adjacent columns; wherein the two adjacent pixels in the two adjacent rows and the two adjacent pixels in the two adjacent columns overlap with each other; and an insertion module configured to insert the newly added row pixels between two adjacent pixels in each row of pixels, insert the newly added column pixels between adjacent two pixels in each column of pixels, and insert the central pixel in the surrounding area composed of the newly added row pixels and the newly added column pixels, in order to obtain a super-resolution image reconstructed corresponding to the original image;

wherein the newly added row and column pixel module specifically comprises:

a row pixel visible relationship unit configured to determine, according to a gray scale value of each pixel and a row position of each pixel in a pixel row, at least one visible row pixel of each pixel in a row pixel group; wherein each pixel and the at least one the visible row pixel corresponding to each pixel satisfy a preset visible condition; and a newly added row pixel gray scale value acquisition unit configured to obtain a gray scale value corresponding to a newly added row pixel of any row position between two adjacent pixels in each row of pixels, according to the gray scale value and the row position of each pixel, and a gray scale value and a row position of the at least one visible row pixel corresponding to each pixel;

wherein the newly added row pixel gray scale value acquisition unit is specifically configured to:

according to the gray scale value and the row position of each pixel, and the gray scale value and the row position of the at least one visible row pixel corresponding to each pixel, establish a visible function relationship between each pixel and each corresponding visible row pixel, respectively;

select, according to the visible function relationship between each pixel and each corresponding visible row pixel, a visible function relationship associated with two adjacent pixels in each row of pixels; wherein the visible function relationship associated with the two adjacent pixels is a visible function relationship that has an intersection with row positions between the two adjacent pixels; and obtain the gray scale value corresponding to the newly added row pixel at any row position between the two adjacent pixels according to the visible function relationship associated with the two adjacent pixels wherein the newly added row pixel gray scale value acquisition unit specifically configured to obtain the gray scale value corresponding to the newly added row pixel at any row position between the two adjacent pixels according to the visible function relationship associated with the two adjacent pixels further comprises:

according to any row position between the two adjacent pixels, and all the visible function relationships associated with the two adjacent pixels, obtaining a plurality of initial gray scale values corresponding to the newly added row pixel at any row position; and using an average value of the plurality of initial gray scale values as the gray scale value corresponding to the newly added row pixel at any row position.

10. The super-resolution image reconstruction device according to claim 9, wherein the newly added central pixel module is specifically configured to:

select the two adjacent pixels in the two adjacent rows and the two adjacent pixels in the two adjacent columns that overlap each other; and use an average value of gray scale values of newly added row pixels between the two adjacent pixels in the two adjacent rows and gray scale values of the newly added column pixels between the two adjacent pixels in the two adjacent columns as the gray scale value corresponding to the newly added central pixel.

* * * * *